(12) United States Patent
Oh (10) Patent No.: US 8,597,845 B2
(45) Date of Patent: Dec. 3, 2013

(54) FUEL CELL SYSTEM WITH HEAT TRANSFEROR AND FUEL TANK AND METHOD OF DRIVING THE SAME

(75) Inventor: Min-Jung Oh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1197 days.

(21) Appl. No.: 11/973,706

(22) Filed: Oct. 10, 2007

(65) Prior Publication Data
US 2008/0113239 A1 May 15, 2008

(30) Foreign Application Priority Data
Nov. 15, 2006 (KR) .................. 10-2006-0112923

(51) Int. Cl.
*H01M 8/04* (2006.01)
(52) U.S. Cl.
USPC ............ 429/436; 429/433; 429/434; 429/440
(58) Field of Classification Search
USPC .................... 429/433, 434, 436, 440
See application file for complete search history.

(56) References Cited

U.S. PATENT DOCUMENTS

| 6,183,895 B1* | 2/2001 | Kudo et al. ............... 429/410 |
| 7,709,117 B2* | 5/2010 | Lee et al. ............... 429/425 |
| 2005/0029903 A1* | 2/2005 | Tadayon et al. ........... 310/314 |
| 2006/0181848 A1* | 8/2006 | Kiley et al. ............. 361/697 |
| 2006/0216561 A1* | 9/2006 | Chien et al. ............. 429/26 |
| 2008/0008914 A1* | 1/2008 | Edlund ............... 429/20 |

FOREIGN PATENT DOCUMENTS

| JP | 07-012476 A | 1/1995 |
| JP | 2004-281130 A | 10/2004 |
| JP | 2006-114267 A | 4/2006 |
| KR | 2005-0011929 | 1/2005 |
| KR | 2006-0080093 | 7/2006 |

* cited by examiner

*Primary Examiner* — Zachary Best
(74) *Attorney, Agent, or Firm* — Knobbe, Martens, Olson & Bear LLP (57) ABSTRACT

A fuel cell system is disclosed. In one embodiment, the fuel cell system includes: i) a fuel tank that contains a fuel in at least a partially liquefied state, ii) a heat-generating unit that generates heat, iii) a heat-transfer unit that is connected between the heat-generating unit and the fuel tank to transport the heat to the fuel tank, and iv) a temperature-regulating unit that regulates a temperature of the fuel tank.

20 Claims, 8 Drawing Sheets

FUEL CELL SYSTEM WITH HEAT TRANSFEROR AND FUEL TANK AND METHOD OF DRIVING THE SAME

CROSS-REFERENCE TO RELATED APPLICATION

This application claims priority to and the benefit of Korean Patent Application No. 10-2006-0112923 filed in the Korean Intellectual Property Office on Nov. 15, 2006, the entire contents of which are incorporated herein by reference.

BACKGROUND OF THE INVENTION

1. Field of the Invention

The present invention relates to a fuel cell system, and more particularly, to a fuel cell system using a liquefied gas such as butane and a method of driving the fuel cell system.

2. Description of the Related Technology

As is well known, a fuel cell is an apparatus that generates electrical energy by using a fuel and an oxidizing gas. Fuel cells are mainly classified as polymer electrolyte membrane fuel cells and direct oxidization membrane fuel cells. A fuel cell system using the polymer electrolyte membrane fuel cell includes, among other things, i) a stack constructed by sequentially stacking a plurality of fuel cells, ii) a reformer that reforms a fuel to generate a reforming gas, iii) a fuel supply unit that supplies the fuel to the reformer, and iv) an oxidizing gas supply unit that supplies an oxidizing gas to the stack. When the fuel is supplied to the reformer, the reformer reforms the fuel to generate the reforming gas. When the reforming gas and the oxidizing gas are supplied to the stack, the stack generates electric energy through an electro-chemical reaction of the reforming gas and the oxidizing gas.

During the driving of the fuel cell system, the stack generates heat through a reduction reaction of the oxidizing gas, and the reformer also generates heat through a preferential CO oxidation (PROX) reaction for reducing a concentration of carbon monoxide contained in the reforming gas. The stack and reformer are cooled by an air-cooling unit or a water-cooling unit, so that the stack and reformer can be maintained at suitable operation temperatures.

SUMMARY OF CERTAIN INVENTIVE ASPECTS

One aspect of the present invention provides a fuel cell system having a simple structure that is capable of cooling a fuel cell stack and a reformer that generates heat and transfers the heat generated from the fuel cell stack and the reformer to a fuel tank, and a method of driving the fuel cell system.

Another aspect of the present invention provides a fuel cell system including: i) a fuel tank that contains a fuel in at least a partially liquefied state, ii) a heat-generating unit that generates heat, iii) a heat-transfer unit that is connected between the heat-generating unit and the fuel tank to transport the heat to the fuel tank and iv) a temperature-regulating unit that regulates a temperature of the fuel tank.

In the above aspect, the heat-generating unit may be designed to be a high temperature portion, and the fuel tank may be designed to be a low temperature portion.

In addition, the heat-transfer unit may be a heat pipe. Further, the heat pipe may include a heat-absorbing part that is provided to one end of the heat pipe, a heat-releasing part that is provided to the other end of the heat pipe, and a heat-isolating part that is provided between the heat-absorbing and heat-releasing parts.

The heat-absorbing part of the heat pipe may be connected to the heat-generating unit, and the heat-releasing part of the heat pipe may be connected to the fuel tank. The heat-absorbing part of the heat pipe may be provided with fins.

The heat-transfer unit may include a heat-releasing plate that is disposed to be in contact with the fuel tank, and a heat pipe that is connected between the heat-generating unit and the heat-releasing plate. The heat-releasing plate may be provided with a mounting surface having a shape matching the fuel tank so as to mount the fuel tank.

The temperature-regulating unit may include a temperature sensor that senses the heat transferred to the fuel tank, a cooling fan that is used to cool the fuel tank, and a controller that provides a control signal to the cooling fan according to a sensing signal of the temperature sensor. The temperature sensor may be disposed on the heat-releasing plate.

The heat-generating unit may include a reformer that reforms the fuel to generate a reforming gas. In addition, the heat-generating unit may include a heat-isolating housing that accommodates the reformer, and the heat-transfer unit may be disposed to penetrate the housing and to be connected to the fuel tank.

The heat-generating unit may include an electricity generator that generates electrical energy through a reaction of the reforming gas and an oxidizing agent and a heat-isolating housing that accommodates the electricity generator, and the heat-transfer unit may be disposed to penetrate the housing and to be connected to the fuel tank.

The heat-releasing unit may include the reformer and the electricity generator. Further, the heat-generating unit may include a heat-isolating housing that accommodates the reformer and the electricity generator, and the heat-transfer unit may be disposed to penetrate the housing and to be connected to the fuel tank.

The heat-generating unit may include at least one circuit device portion.

In addition, the fuel may be a liquefied gas that may be in a gaseous state at room temperature. The fuel has a main component that may be at least one selected from a group consisting of methane, ethane, propane, and butane, and the fuel contains the propane and the butane in a mixture ratio of about 1:9 to about 1:1.

Another aspect of the present invention provides a driving method for a fuel cell system having a fuel tank that contains a fuel in at least a partially liquefied state, including: i) transferring heat that is generated from a heat-generating unit at a time of driving the fuel cell system to the fuel tank through a heat pipe, ii) sensing the heat transferred to the fuel tank by using a temperature sensor iii) providing a control signal to a cooling fan according to a sensing signal of the temperature sensor and iv) selectively providing cooling air to the fuel tank by driving the cooling fan.

In the above aspect, the method may further include, when the temperature sensed by the temperature sensor is higher than a reference temperature, providing a turn-on signal to the cooling fan.

The method may further include, when the temperature sensed by the temperature sensor is lower than the reference temperature, providing a turn-off signal to the cooling fan.

The reference temperature may be in a range of about 30 to about 40° C.

BRIEF DESCRIPTION OF THE DRAWINGS

Embodiments of the present invention will be described with reference to the attached drawings.

DETAILED DESCRIPTION OF CERTAIN INVENTIVE EMBODIMENTS

Recently, fuel cell systems using a liquefied gas fuel that is easily commercially obtained have been disclosed. Since the liquefied gas fuel has a low boiling point and can be easily vaporized at a relatively low pressure, the fuel is contained in a fuel tank in a partially liquefied state to be supplied to the reformer.

In such a fuel cell system, at least part of the fuel is stored in the liquefied state. When the fuel is vented from the fuel tank, the fuel is vaporized and absorbs the ambient heat of the fuel tank. Due to the absorbed heat, that is, the latent heat, the temperature of the fuel tank is lowered. When the temperature of the fuel tank is lower than the boiling point of the fuel, the vaporization efficiency of the fuel deteriorates, and the internal pressure decreases. Furthermore, in winter or at a low-temperature site, the temperature of the fuel tank may be lower than the boiling point of the fuel.

The decrease in the internal pressure of the fuel tank hinders generating a suitable amount of fuel to supply to the reformer. One aspect of the invention provides a fuel cell system capable of efficiently supplying a suitable amount of the fuel to the reformer by providing the heat to the fuel tank without increasing power consumption Hereinafter, exemplary embodiments of the present invention will be described in detail with reference to the attached drawings. However, the present invention is not limited to the exemplary embodiments, but may be embodied in various forms.

Figure 1:
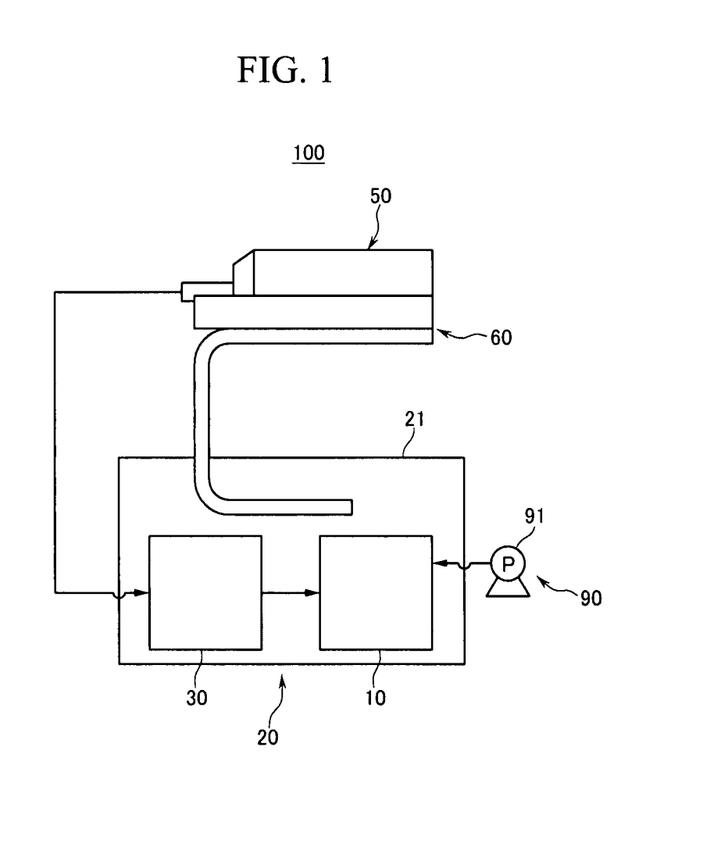
FIG. 1 is a schematic block diagram showing a construction of a fuel cell system according to a first embodiment of the present invention.

FIG. 1 is a schematic block diagram showing a construction of a fuel cell system according to a first embodiment of the present invention.

Referring to FIG. 1, the fuel cell system 100 is an electricity generating system that generates electric energy by using a fuel and an oxidizing agent. The fuel cell system may be used as a portable power supply device.

In one embodiment, the fuel cell system 100 is constructed as a polymer electrolyte membrane fuel cell type. In the polymer electrolyte membrane fuel cell system, the fuel is reformed to generate a reforming gas having a great deal of hydrogen, and electric energy is generated through an oxidation reaction of the reforming gas and a reduction reaction of the oxidizing gas.

Components of the fuel cell system 100 may be accommodated in a case (not shown), that is, an outer case of the fuel cell system 100.

In one embodiment, the fuel is stored in a partially liquefied state in a predetermined container. The fuel may include a liquefied gas that is in a gaseous state at room temperature. A hydro-carbon liquefied gas such as methane, ethane, propane, and butane may be used as the fuel.

In one embodiment, since a portable fuel cell system used as a portable power supply device is exemplified, a butane fuel is exemplified as the fuel. The butane fuel, which is in the gaseous state at room temperature, is stored and commercially sold in a liquefied state in a container. Therefore, the butane fuel is suitable for a fuel of the portable fuel cell system.

In one embodiment, the butane fuel includes propane and butane in a mixture ratio of about 1:9 to about 1:1. Since normal butane (n-butane) has a boiling point of $-0.5°$ C. and is hard to vaporize in winter or at a low-temperature site, the butane fuel formed by mixing the propane having a boiling point of $-11.5°$ C. and iso-butane having a boiling point of $-42°$ C. is used in one embodiment.

The fuel cell system 100 includes a heat-generating unit 20, a fuel tank 50, and an oxidizing gas supply unit 90.

The heat-generating unit 20 generates heat during the driving of the fuel cell system 100. The heat-generating unit 20 includes an electricity generator 10 and a reformer 30.

The electricity generator 10 is supplied with a reforming gas from the reformer 30 and with an oxidizing gas from the oxidizing gas supply unit 90. The electricity generator 10 includes a plurality of unit cells, each of which generates the electrical energy through an oxidation reaction of the reforming gas and a reduction reaction of the oxidizing gas.

The electricity generator 10 is generally called a fuel cell stack, which is constructed by sequentially stacking unit cells. The electricity generator 10 generates heat at a predetermined temperature during the reduction reaction of the oxidizing gas.

According to one embodiment, the electricity generator 10 is accommodated in a hermetically-sealed housing 21 that is made of a heat-isolating material. The construction of the electricity generator 10 is substantially the same as that of a general fuel cell stack used for a polymer electrolyte fuel cell system, so a detailed description thereof is omitted.

The reformer 30 generates a reforming gas that contains a great deal of hydrogen from the fuel through a reforming reaction, i.e., a preferential CO oxidization (PROX) reaction. In the related field, the reformer 30 is sometimes referred to as a fuel processor.

The preferential CO oxidization reaction is an exothermic reaction of the carbon monoxide contained in the reforming gas and the oxidizing gas supplied from the oxidizing gas supply unit 90. Due to the preferential CO oxidization reaction, the concentration of carbon monoxide can be reduced.

Accordingly, the reformer 30 generates heat at a predetermined temperature through the heat-generating reaction. The reformer 30 together with the electricity generator 10 is accommodated in the housing 21. The construction of the reformer 30 is substantially the same as that of a general reformer used for a polymer electrolyte fuel cell system, so a detailed description thereof is omitted.

In one embodiment, the fuel tank 50 is constructed as a cylindrical can that contains a compressed fuel in a partially liquefied state.

The fuel tank 50 may be detachably provided to a case (not shown), that is, an outer case of the fuel cell system 100.

The oxidizing gas supply unit 90 is used to supply air as an oxidizing gas to the electricity generator 10. The oxidizing gas supply unit 90 includes a general air pump 91 that draws the air and blows it with a pressure into the electricity generator 10.

During the driving of such a fuel cell system 100, the reformer 30 generates a reforming gas from the fuel received from the fuel tank 50 and supplies the reforming gas to the electricity generator 10. In the process, the reformer 30 generates heat due to the preferential CO oxidization reaction of carbon monoxide contained in the reforming gas and the oxidizing gas supplied from the oxidizing gas supply unit 90.

The electricity generator 10 receives the reforming gas from the reformer 30 and the oxidizing gas from the oxidizing gas supply unit 90 and generates electrical energy through an electrochemical reaction of the reforming gas and the oxidizing gas. In the process, the electricity generator 10 generates heat due to a reduction reaction of the oxidizing gas.

Since the fuel is stored in the fuel tank 50 in the compressed liquefied state, when the fuel is vented from the fuel tank 50, the fuel is vaporized to absorb the ambient heat of the fuel tank 50, which subsequently reduces the temperature of the fuel tank 50 (and the fuel). When the temperature of the fuel tank 50 is lower than the boiling point of the fuel, the vaporization efficiency of the fuel deteriorates, and the internal pressure of the fuel tank 50 decreases.

Furthermore, in winter or at a low-temperature site, the temperature of the fuel tank 50 may be lower than the boiling point of the fuel.

As a result, the decrease in the internal pressure of the fuel tank 50 prevents the fuel from being efficiently supplied to the reformer 30.

According to one embodiment, since the fuel cell system 100 includes a heat-transfer unit 60, the heat generated from the heat-generating unit 20 can be transferred to the fuel tank 50 through the heat-transfer unit 60.

More specifically, the heat-transfer unit 60 transfers the heat generated from the electricity generator 10 and the reformer 30 during the driving of the fuel cell system to the fuel tank 50, so that the electricity generator 10 and the reformer 30 can be cooled down to suitable operating temperatures thereof. In addition, the internal pressure of the fuel tank 50 can be increased, so that it is possible to efficiently supply the fuel to the reformer 30.

Figure 2:
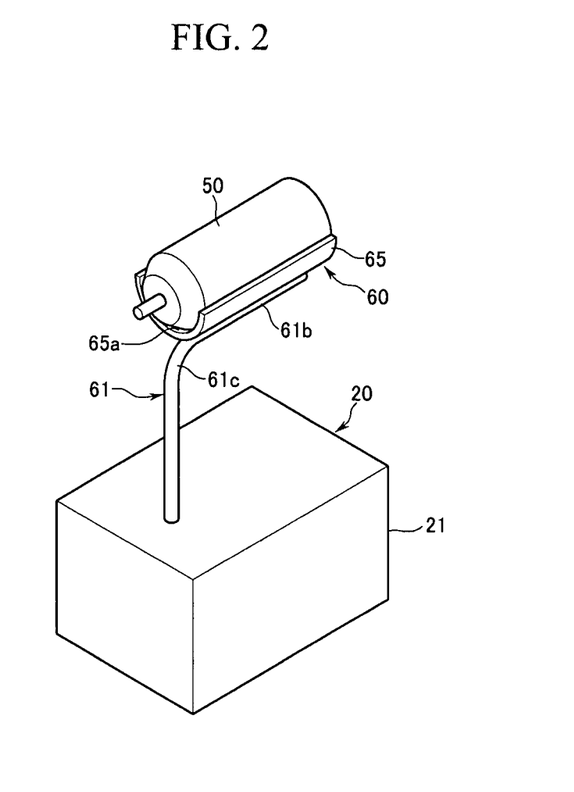
FIG. 2 is a perspective view showing a connection of a heat-transfer unit and a heat-generating unit shown in FIG. 1.
Figure 3:
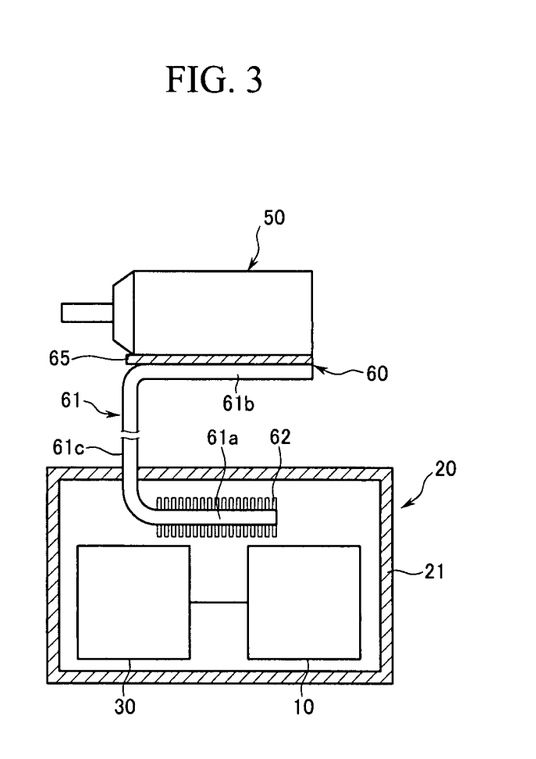
FIG. 3 is a schematic cross-sectional view showing a construction shown in FIG. 2.

FIG. 2 is a perspective view showing a connection of a heat-transfer unit and a heat-generating unit shown in FIG. 1, and FIG. 3 is a schematic cross-sectional view showing a construction shown in FIG. 2.

In one embodiment, as shown in FIGS. 2 and 3, the heat-transfer unit 60 includes a heat pipe 61 that transfers the heat generated by the heat-generating unit 20 to the fuel tank 50, and a heat-releasing plate 65.

The heat pipe 61 serves as a heat-transfer device for transferring heat from a portion having a high heat releasing density (high-temperature portion) to a portion having a low heat releasing density (low-temperature portion) by using latent heat required for phase transition of a fluid.

In one embodiment, the heat pipe 61 is constructed with a heat-conducting main body having a shape of a pipe, a wick formed in the main body, and operating fluid that fills an inner portion of the main body.

The operating fluid is vaporized in the high-temperature portion of the heat pipe 61. While the vapor of the operating fluid is moved toward the low-temperature portion, the vapor is condensed, so that the latent heat is generated. Next, the condensed operating fluid is returned to the high-temperature portion through the wick. In such a process, the heat can be transferred from the high-temperature portion to the low-temperature portion.

The high-temperature portion denotes the heat-generating unit 20, and the low-temperature portion denotes the fuel tank 50.

The heat pipe 61 includes a heat-absorbing part 61a that is formed at one end of the body, a heat-releasing part 61b that is formed at the other end of the body, and a heat-isolating part 61c that is interposed between the heat-absorbing part 61a and the heat-releasing part 61b.

The heat-absorbing part 61a absorbs the heat to vaporize the operating fluid. The heat-isolating part 61c moves the working fluid to the heat-releasing part 61b. The heat-releasing part 61b releases the heat to condense the operating fluid. The operating fluid condensed in the heat-releasing part 61b is returned to the heat-absorbing part 61a through the heat-isolating part 61c.

In the heat pipe 61 according to one embodiment, the heat-absorbing part 61a is connected to the heat-generating unit 20, and the heat-releasing part 61b is in contact with the heat-releasing plate 65.

In one embodiment, the heat-absorbing part 61a is constructed to penetrate the housing 21 that accommodates the electricity generator 10 and the reformer 30 and is disposed within an inner space of the housing 21. The heat-absorbing part 61a is provided with a plurality of heat-conducting fins 62.

The fins 62 are used to efficiently transfer the heat generated from the electricity generator 10 and the reformer 30 in the housing 21 to the heat-absorbing part 61a.

In one embodiment, the heat-releasing part 61b is substantially connected to the fuel tank 50. For example, the heat-releasing part 61b is fixed on and in contact with a bottom of a later-described heat-releasing plate 65.

The heat-releasing plate 65 has a function of receiving the heat released from the heat-releasing part 61b of the heat pipe 61 and transferring the heat to the fuel tank 50. The heat-releasing plate 65 is made of, for example, a heat-conducting metal. The heat-releasing plate 65 is disposed to be in contact with an outer surface of the fuel tank 50.

In one embodiment, the heat-releasing plate 65 has a semi-cylindrical structure that matches with an outer appearance of the fuel tank 50. The heat-releasing plate 65 includes a mounting surface 65a that is in contact with the outer surface of the fuel tank 50 and mounts the fuel tank 50. In one embodiment, the heat-releasing part 61b of the heat pipe 61 is fixed on a bottom of the heat-releasing plate 65.

In such a fuel cell system 100 according to one embodiment, when the fuel stored in the fuel tank 50 is vented from the fuel tank 50, the fuel is vaporized to absorb the ambient heat of the fuel tank 50 and is supplied to the reformer 30.

The reformer 30 generates a reforming gas containing a substantial amount of hydrogen from the fuel through a reforming reaction, a preferential CO oxidization reaction, or the like, and supplies the reforming gas to the electricity generator 10. In the process, the reformer 30 generates heat due to the preferential CO oxidization reaction.

The electricity generator 10 receives the oxidizing gas from the oxidizing gas supply unit 90 and generates electrical energy through an electro-chemical reaction of the reforming gas and the oxidizing gas. In the process, the electricity generator 10 generates heat due to the reduction reaction of the oxidizing gas.

As discussed above, when the fuel is vented from the fuel tank 50, the fuel is vaporized to absorb (take away) the ambient heat of the fuel tank 50, which lowers the temperature of the fuel. In addition, the vaporization efficiency of the fuel deteriorates, and the internal pressure of the fuel tank 50 decreases.

As a result, the fuel tank 50 cannot efficiently supply the fuel to the reformer 30. Since the electricity generator 10 and the reformer 30 are accommodated in the heat-isolating housing 21, the heat generated from the electricity generator 10 and the reformer remains in the housing 21.

The heat remaining in the housing 21 can be absorbed by the heat-absorbing part 61a of the heat pipe 61 through the fins 62 and transferred to the heat-releasing plate 65 due to the operation of the heat pipe 61.

Since the heat-releasing plate 65 is disposed to be in contact with the fuel tank 50, the heat transported to the heat-releasing plate 65 is provided to the fuel tank 50 through the heat-releasing plate 65.

As described above, according to one embodiment, since the heat generated from the electricity generator 10 and the reformer 30 is provided to the fuel tank 50, the temperature of the fuel tank 50 increases, and the internal pressure of the fuel tank 50 also increases up to a predetermined level. Accordingly, vaporization efficiency of the fuel is improved, so that the fuel can be efficiently supplied to the reformer 30.

In addition, according to one embodiment, since the heat generated from the electricity generator 10 and the reformer 30 is partially provided to the fuel tank 50, the electricity generator 10 and the reformer 30 can be cooled down to a specific operating temperature thereof.

Figure 4:
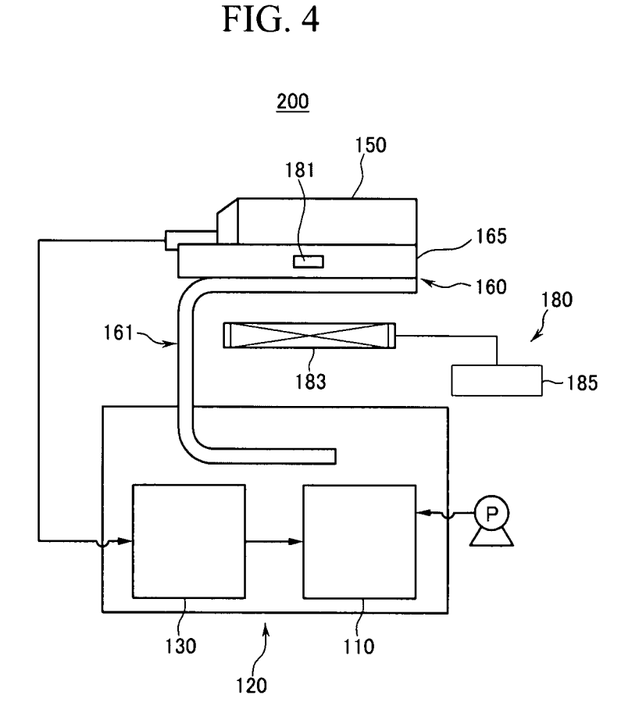
FIG. 4 is a schematic block diagram showing a construction of a fuel cell system according to a second embodiment of the present invention.

FIG. 4 is a schematic block diagram showing a construction of a fuel cell system according to a second embodiment of the present invention.

The fuel cell system 200 of FIG. 4 has basically the same construction as the fuel cell system 100 according to the first embodiment except that the fuel cell system 200 further includes a temperature-regulating unit (or a temperature controller) 180 that regulates a temperature of a fuel tank 150.

When excessive heat is supplied from a heat-generating unit 120 to the fuel tank 150 through the heat-transfer unit 160, the temperature-regulating unit 180 senses the overheating such that the fuel tank 150 can be cooled.

Such a construction is provided in order to prevent the fuel tank 150 from exploding when the excessive heat over the reference temperature range is supplied to the fuel tank 150.

According to one embodiment, the temperature-regulating unit 180 includes a temperature sensor 181, a cooling fan 183, and a controller 185.

The temperature sensor 181 senses the heat (or the temperature adjacent to the fuel tank) that is provided from the heat-generating unit 120 to the fuel tank 150 through the heat-transfer unit 160.

In one embodiment, the temperature sensor 181 is disposed on a heat-releasing plate 165 of the heat-transfer unit 160. The temperature sensor 181 may be a general temperature sensor that senses the temperature of the heat-releasing plate 165 and provides a sensing signal to the controller 185.

The cooling fan 183 may be a general cooling fan that provides cooling air to the fuel tank 150. In one embodiment, the cooling fan 183 is disposed under the heat-releasing plate 165 to blow the cooling air to the heat-releasing plate 165.

In another embodiment, the cooling fan 183 may be disposed above the fuel tank 150 or at the other places. The cooling fan 183 is electrically connected to the controller 185 to be selectively driven according to a control signal provided by the controller 185.

The controller 185 is used to control the operation of the cooling fan 183. The controller 185 applies a control signal such as a turn-on signal and a turn-off signal to the cooling fan 183.

When the heat generated from the heat-generating unit 120 is provided through the heat pipe 161 and the heat-releasing plate 165 to the fuel tank 150, the controller 185 receives and determines the sensing signal from the temperature sensor 181 to provide a control signal to the cooling fan 183.

The controller 185 determines the sensing signal of the temperature sensor 181 to measure the temperature of the heat-releasing plate 165. The controller 185 compares the measured temperature with a predetermined reference temperature in a range of, for example, about 30 to about 40° C. When the measured temperature is higher than the reference temperature, the controller 185 provides a turn-on signal to the cooling fan 183.

When the measured temperature is lower than the reference temperature, the controller 185 provides a turn-off signal to the cooling fan 183.

The reference temperature is a temperature at which the fuel tank 150 containing mainly the butane can be safely operated. When excessive heat is supplied to the fuel tank 150, the temperature of the fuel tank 150 exceeds the reference temperature range, so that the fuel tank may explode. Therefore, the reference temperature range of about 30 to about 40° C. is selected in order to prevent the fuel tank 150 from exploding.

Since other components and operations of the fuel cell system 200 according to one embodiment are substantially the same as those of the first embodiment, detailed descriptions thereof are omitted.

According to a method of driving the aforementioned fuel cell system 200, during the driving of the fuel cell system 200, heat is generated from the electricity generator 110 and the reformer 130 of the heat-generating unit 120. As described in the first embodiment, the heat is transferred to the heat-releasing unit 165 through the heat pipe 161 and supplied to the fuel tank 150.

In the process, the temperature sensor 181 senses the heat supplied to the heat-releasing plate 165 and provides a sensing signal to the controller 185. The controller 185 determines the sensing signal of the temperature sensor 181 to measure the temperature of the heat-releasing plate 165. The controller 185 compares the measured temperature with a predetermined reference temperature of the heat-releasing plate 165.

When the measured temperature of the heat-releasing plate 165 is higher than the reference temperature, the controller 185 provides a turn-on signal to the cooling fan 183. When the cooling fan 183 is driven by the controller 185, the cooling fan 183 blows cooling air to the heat-releasing plate 165.

During the process, when the measured temperature of the heat-releasing plate 165 is lowered below the reference temperature range, the controller 185 receives a sensing signal corresponding to the temperature from the temperature sensor 181. The controller 185 performs the aforementioned determination, calculation, and comparison processes to provide a turn-off signal to the cooling fan 183. As a result, the controller 185 allows the cooling fan 183 to stop driving.

In one embodiment, by repeating the aforementioned processes, the heat generated from the heat-generating unit 120 is supplied to the fuel tank 150, so that the internal pressure of the fuel tank 150 can be maintained at a predetermined level. In addition, when excessive heat is transferred to the fuel tank 150, the cooling fan 183 is driven to cool the fuel tank 150.

Figure 5:
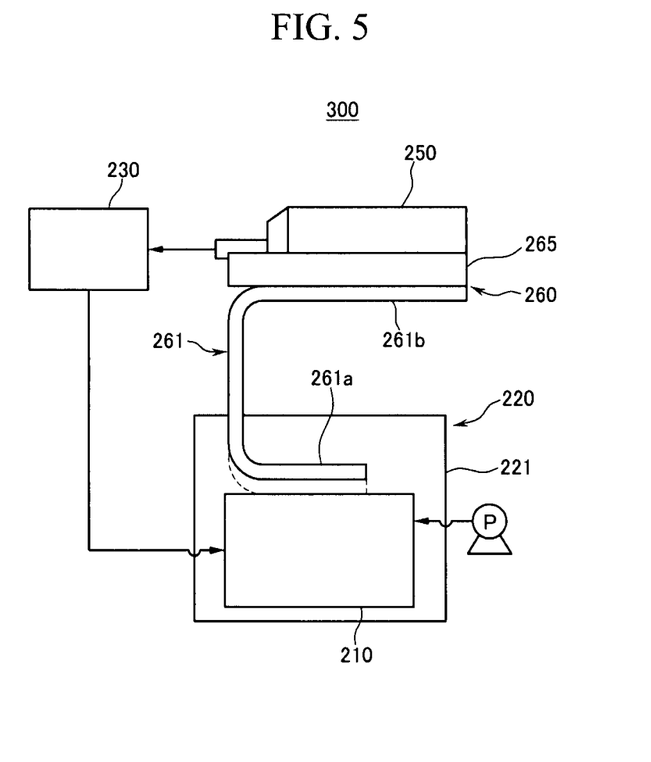
FIG. 5 is a schematic block diagram showing a construction of a fuel cell system according to a third embodiment of the present invention.

FIG. 5 is a schematic block diagram showing a construction of a fuel cell system according to a third embodiment of the present invention.

The fuel cell system 300 may includes a heat-transfer unit 260 that transfers heat generated from an electricity generator 210 to a fuel tank 250 and a heat-generating unit 220 having a first housing 221 which accommodates the electricity generator 210.

In one embodiment, the heat-transfer unit 260 is connected between the first housing 221 and a heat-releasing plate 265. For example, a heat-absorbing part 261a of a heat pipe 261 is constructed to penetrate the first housing 221 and is disposed within an inner space of the first housing 221. A heat-releasing part 261b of the heat pipe 261 is in contact with the heat-releasing plate 265.

Alternatively, the heat-absorbing part 261a of the heat pipe 261 may be disposed to be in direct contact with the electricity generator 210 as shown with a dotted line.

A reformer 230 is disposed not to be accommodated in the housing 221. The reformer 230 is disposed within a case (not shown), that is, an outer case of the fuel cell system. The reformer 230 can be cooled by using a separate cooling unit.

According to one embodiment, the heat generated from the electricity generator 210 can be transferred to the fuel tank 250 through the heat-transfer unit 260.

Since other components and operations of the fuel cell system 300 are substantially the same as those of the first embodiment, detailed descriptions thereof are omitted.

Figure 6:
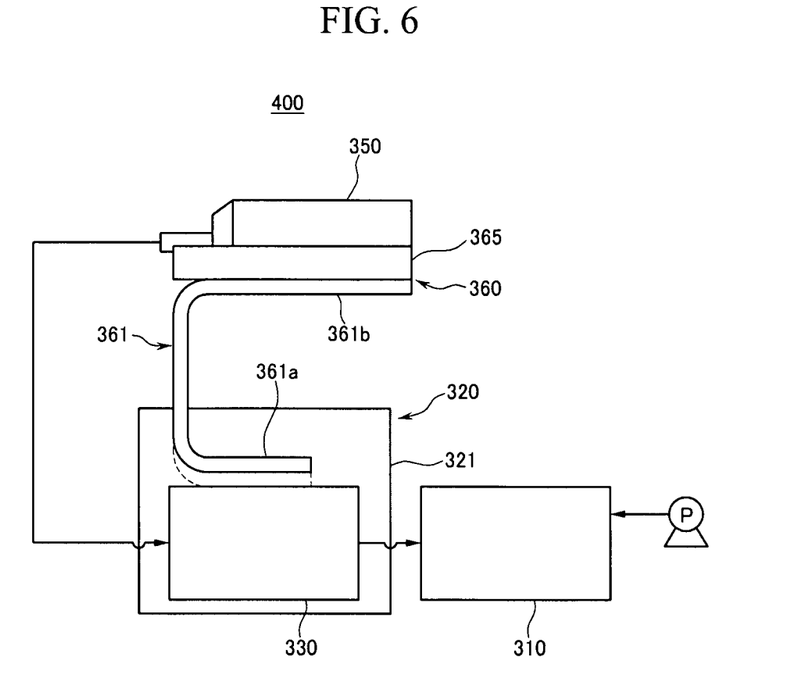
FIG. 6 is a schematic block diagram showing a construction of a fuel cell system according to a fourth embodiment of the present invention.

FIG. 6 is a schematic block diagram showing a construction of a fuel cell system according to a fourth embodiment of the present invention.

The fuel cell system 400 may include a heat-transfer unit 360 that transfers heat generated from a reformer 330 to a fuel tank 350, and a heat-generating unit 320 having a second housing 321 that accommodates the reformer 330.

In one embodiment, the heat-transfer unit 360 is connected between the second housing 321 and a heat-releasing plate 365. For example, a heat-absorbing part 361a of a heat pipe 361 is constructed to penetrate the second housing 321 and is disposed within an inner space of the second housing 321. A heat-releasing part 361b of the heat pipe 361 is in contact with the heat-releasing plate 365.

Alternatively, the heat-absorbing part 361a of the heat pipe 361 may be disposed to be in direct contact with the reformer 330 as shown with a dotted line.

An electricity generator 310 is disposed not to be accommodated in the housing 321. The electricity generator 310 is disposed within a case (not shown), that is, an outer case of the fuel cell system. The electricity generator 310 can be cooled by using a separate cooling unit.

According to one embodiment, the heat generated from the reformer 330 can be transferred to the fuel tank 350 through the heat-transfer unit 360.

Since other components and operations of the fuel cell system 400 are substantially the same as those of the first embodiment, detailed descriptions thereof are omitted.

Figure 7:
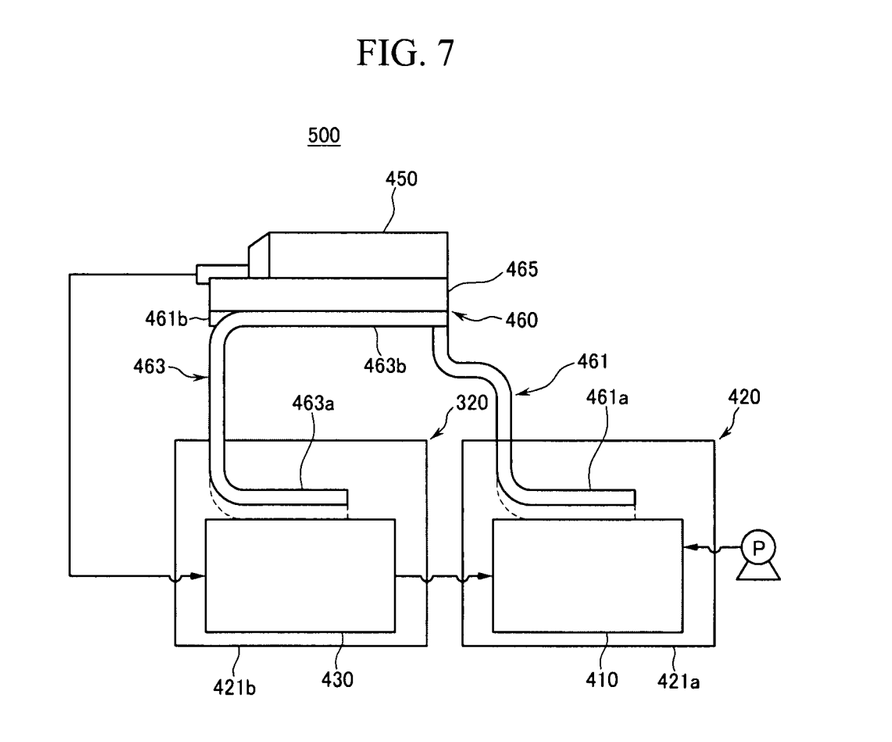
FIG. 7 is a schematic block diagram showing a construction of a fuel cell system according to a fifth embodiment of the present invention.

FIG. 7 is a schematic block diagram showing a construction of a fuel cell system according to a fifth embodiment of the present invention.

The fuel cell system 500 may include a heat-transfer unit 460 that transfers heat generated from an electricity generator 410 and a reformer 430 to a fuel tank 450 and a heat-generating unit 420 having a first housing 421a that accommodates the electricity generator 410 and a second housing 421b that accommodates the reformer 430.

In one embodiment, the heat-transfer unit 460 is connected between the first housing 421a and the heat-releasing plate 465 and between the second housing 421b and the heat-releasing plate 465. For example, the heat-transfer unit 460 includes a first heat pipe 461 that is connected between the first housing 421a and the heat-releasing plate 465 and a second heat pipe 463 that is connected between the second housing 421b and the heat-releasing plate 465.

In one embodiment, a heat-absorbing part 461a of the first heat pipe 461 is constructed to penetrate the first housing 421a and is disposed within an inner space of the first housing 421a. A heat-releasing part 461b of the first heat pipe 461 is in contact with the heat-releasing plate 465. In addition, a heat-absorbing part 463a of the second heat pipe 463 is constructed to penetrate the second housing 421b and disposed within an inner space of the second housing 421b. A heat-releasing part 463b of the second heat pipe 463 is in contact with the heat-releasing plate 465.

Alternatively, the heat-absorbing part 461a of the first heat pipe 461 may be disposed to be in direct contact with the electricity generator 410 as shown with a dotted line. In addition, the heat-absorbing part 463a of the second heat pipe 463 may be disposed to be in direct contact with the reformer 430 as shown with a dotted line.

According to one embodiment, the heat generated from the electricity generator 410 and the heat generated from the reformer 430 can be separately transferred to the fuel tank 450 through the first heat pipe 461 and the second heat pipe 463, respectively.

Since other components and operations of the fuel cell system 500 are substantially the same as those of the first embodiment, detailed descriptions thereof are omitted.

Figure 8:
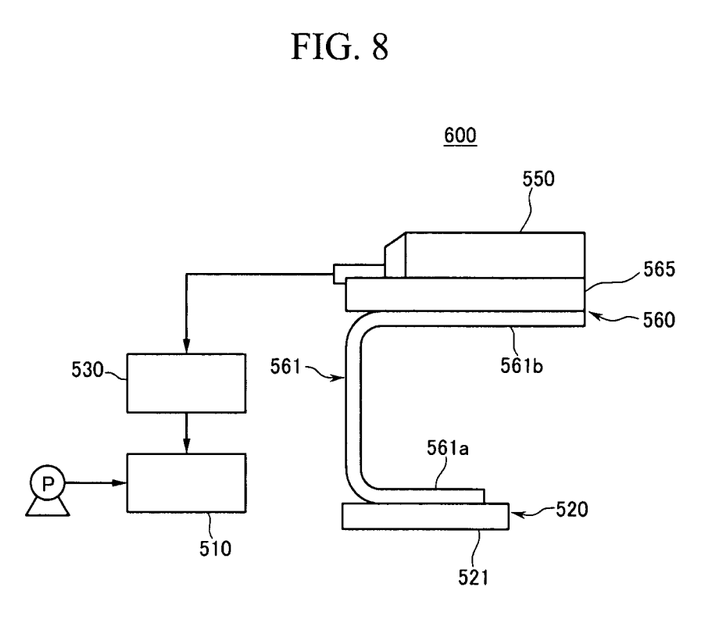
FIG. 8 is a schematic block diagram showing a construction of a fuel cell system according to a sixth embodiment of the present invention.

FIG. 8 is a schematic block diagram showing a construction of a fuel cell system according to a sixth embodiment of the present invention.

The fuel cell system 600 may include at least one circuit device portion 521 as a heat-generating unit 520 and a heat-transfer unit 560 that transfers heat generated from the circuit device portion 521 to a fuel tank 550.

The circuit device portion 521 may include circuit devices for controlling the driving of the overall fuel cell system. Due to current and electrical signals that flow through the circuit device portion 521, the heat can be generated from the circuit device portion 521.

In one embodiment, the heat-transfer unit 560 includes a heat pipe 561 which is connected between the circuit device portion 521 and the heat-releasing plate 565. In one embodiment, a heat-absorbing part 561a of the heat pipe 561 is disposed to be in direct contact with the circuit device portion 521. A heat-releasing part 561b of the heat pipe 561 is disposed to be in contact with the heat-releasing plate 565.

In addition, an electricity generator 510 and a reformer 530 are disposed not to be accommodated in a housing. The electricity generator 510 and the reformer 530 are disposed within a case (not shown), that is, an outer case of the fuel cell system. The electricity generator 510 and the reformer 530 can be cooled by using a separate cooling unit.

According to one embodiment, the heat generated from the circuit device portion 521 can be transferred to the fuel tank 550 through the heat-transfer unit 560, and the circuit device portion 521 can be cooled down to a suitable temperature. In another embodiment, other fuel cell components can be used as a heat generator so as to control or increase the temperature of the fuel as long as the components generate heat while driving the fuel cell system.

According to at least one embodiment, since heat generated from an electricity generator and a reformer during the driving of a fuel cell system can be supplied to a fuel tank through a heat-transfer unit, an internal pressure of the fuel tank can be maintained in a constant level, so that a suitable amount of a fuel can be efficiently supplied to the reformer.

According to at least one embodiment, since the electricity generator and the reformer that generate the heat can be cooled by using the heat-transfer unit, it is possible to further improve operating performance of the fuel cell system.

Although exemplary embodiments and modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A fuel cell system comprising:
  a fuel tank configured to contain therein a fuel in at least a partially liquefied state, wherein the fuel tank comprises a top and a bottom opposing each other and a side interposed between the top and the bottom;
  a heat-generating component configured to generate heat as a byproduct of an operation thereof, wherein at least part of the heat-generating component is located directly below the side of the fuel tank;
  a substantially thermally insulated housing enclosing said heat-generating component;
  a heat transferor interconnecting between the heat-generating component and the fuel tank, wherein the heat transferor is configured to transfer the generated heat from the heat-generating component to the fuel tank so as to increase the temperature of the fuel; and
  a temperature controller configured to control the temperature of the fuel,
  wherein the heat transferor comprises: a heat pipe having a working fluid circulating therein, wherein the heat pipe comprises: a heat-absorbing section located at or near one end of the heat pipe and a heat-releasing section located at or near the other end of the heat pipe, wherein the heat-absorbing section is located within the housing and wherein the heat-releasing section is not located within the housing, wherein the heat pipe comprises a non-linear portion, and wherein the heat-absorbing section of the pipe is configured to directly contact the heat-generating component; and
  a heat-releasing plate that is disposed between the heat-releasing section and the fuel tank,
  wherein the heat-releasing plate has first and second surfaces opposing each other, wherein the first surface of the heat-releasing plate contacts the fuel tank, and wherein the second surface of the heat-releasing plate contacts the heat-releasing section.

2. The fuel cell system of claim 1, wherein the heat-generating component is at least one selected from the group consisting of a fuel reformer, a fuel cell stack and an integrated circuit chip.

3. The fuel cell system of claim 1, wherein the heat-releasing section is substantially similar in length to that of the heat-releasing plate.

4. The fuel cell system of claim 1, wherein the heat-absorbing section comprises a plurality of fins.

5. The fuel cell system of claim 1, wherein the fuel tank comprises an exterior surface, wherein the heat-releasing plate comprises a mounting surface having a shape matching with the exterior surface of the fuel tank, and wherein the exterior surface of the fuel tank is mounted on the mounting surface.

6. The fuel cell system of claim 1, wherein the temperature controller comprises:
  a temperature sensor configured to sense the temperature of the fuel or adjacent to the fuel tank;
  a cooling fan configured to blow air to cool the fuel tank; and
  a processor configured to turn on or turn off the cooling fan in view of the sensed temperature.

7. The fuel cell system of claim 6, wherein the heat transferor further comprises:
  a heat-releasing plate configured to contact the fuel tank; and
  a heat pipe thermally connecting between the heat-generating component and the heat-releasing plate, wherein the temperature sensor is located in the heat-releasing plate.

8. The fuel cell system of claim 1, wherein the heat-generating component comprises at least one of a fuel reformer and a fuel cell stack.

9. The fuel cell system of claim 1, wherein the fuel is a liquefied gas that is in a gaseous state at room temperature.

10. The fuel cell system of claim 1, wherein the fuel comprises at least one selected from the group consisting of methane, ethane, propane, and butane.

11. The fuel cell system of claim 10, wherein the fuel comprises the propane and the butane, and wherein the ratio of butane to propane is from about 1:1 to about 9:1.

12. A fuel cell system comprising:
  a fuel tank configured to contain therein a fuel in at least a partially liquefied state, wherein the fuel tank comprises a top and a bottom opposing each other and a side interposed between the top and the bottom;
  a heat-generating component configured to generate heat as a byproduct of an operation thereof, wherein at least part of the heat-generating component is located directly below the side of the fuel tank;
  a substantially thermally insulated housing enclosing said heat-generating component; and
  a heat transferor interconnecting the heat-generating component and the fuel tank, wherein the heat transferor is configured to transfer the generated heat from the heat-generating component to the fuel tank so as to increase the internal pressure of the fuel,
  wherein the heat transferor comprises:
  a heat pipe having a working fluid circulating therein, wherein the heat pipe comprises a heat-absorbing section located at or near one end of the heat pipe and a heat-releasing section located at or near the other end of the heat pipe, wherein the heat-absorbing section is located within the housing and wherein the heat-releasing section is not located within the housing, wherein the heat pipe comprises a non-linear portion, and wherein the heat-absorbing section of the pipe is configured to directly contact the heat-generating component; and
  a heat-releasing plate that is disposed between the heat-releasing section and the fuel tank, wherein the heat-releasing plate has first and second surfaces opposing each other, wherein the first surface of the heat-releasing plate contacts the fuel tank, and wherein the second surface of the heat-releasing plate contacts the heat-releasing section.

13. A method of operating a fuel cell system, comprising:
  providing a fuel cell system having a heat-generating component and a fuel tank containing a fuel, wherein the fuel tank comprises a top and a bottom opposing each other and a side interposed between the top and the bottom, and wherein at least part of the heat-generating component is located directly below the side of the fuel tank;

collecting heat generated from the heat-generating component; and transferring at least part of the collected heat to the fuel tank via a heat transferor so as to heat the fuel contained in the fuel tank, wherein the fuel cell system comprises a substantially thermally insulated housing enclosing said heat-generating component; and wherein the heat transferor comprises:

a heat pipe having a working fluid circulating therein, wherein the heat pipe comprises a heat-absorbing section located at or near one end of the heat pipe and a heat-releasing section located at or near the other end of the heat pipe, wherein the heat-absorbing section is located within the housing and wherein the heat-releasing section is not located within the housing, wherein the heat pipe comprises a non-linear portion, and wherein the heat-absorbing section of the pipe is configured to directly contact the heat-generating component; and a heat-releasing plate that is disposed between the heat-releasing section and the fuel tank, wherein the heat-releasing plate has first and second surfaces opposing each other, wherein the first surface of the heat-releasing plate contacts the fuel tank, and wherein the second surface of the heat-releasing plate contacts the heat-releasing section.

14. The method of claim 13, further comprising, sensing the temperature of the fuel or adjacent to the fuel tank; and selectively turning on or turning off a cooling fan in view of the sensed temperature so as to avoid overheating the fuel tank.

15. The method of claim 14, further comprising turning on the cooling fan when the sensed temperature is higher than a reference temperature.

16. The method of claim 15, further comprising turning off the cooling fan when the sensed temperature is lower than the reference temperature.

17. The method of claim 15, wherein the reference temperature is in the range of about 30 to about 40° C.

18. The fuel cell system of claim 1, wherein the heat pipe further comprises a heat-isolating section interconnecting the heat-absorbing section and the heat-releasing section, and wherein at least one of the heat releasing section and heat absorbing section is substantially perpendicular to the heat isolating section.

19. The fuel cell system of claim 1, wherein the heat pipe further comprises a heat-isolating section interconnecting the heat-absorbing section and the heat-releasing section, and wherein the heat pipe comprises i) a first bent portion formed between the heat releasing section and the heat isolating section and ii) a second bent portion formed between the heat absorbing section and the heat isolating section.

20. The fuel cell system of claim 1, wherein the heat-absorbing section of the heat pipe penetrates the housing.

* * * * *